United States Patent
Park et al.

(10) Patent No.: US 9,591,583 B2
(45) Date of Patent: Mar. 7, 2017

(54) METHOD FOR CONTROLLING TRANSMISSION POWER OF SOUNDING REFERENCE SIGNAL IN WIRELESS COMMUNICATION SYSTEM AND APPARATUS FOR SAME

(71) Applicant: LG ELECTRONICS INC., Seoul (KR)

(72) Inventors: Jonghyun Park, Anyang-si (KR); Hakseong Kim, Anyang-si (KR); Suckchel Yang, Anyang-si (KR); Hanbyul Seo, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/380,645

(22) PCT Filed: Mar. 11, 2013

(86) PCT No.: PCT/KR2013/001931
§ 371 (c)(1),
(2) Date: Aug. 22, 2014

(87) PCT Pub. No.: WO2013/141505
PCT Pub. Date: Sep. 26, 2013

(65) Prior Publication Data
US 2015/0016317 A1    Jan. 15, 2015

Related U.S. Application Data

(60) Provisional application No. 61/612,255, filed on Mar. 17, 2012, provisional application No. 61/614,500, (Continued)

(51) Int. Cl.
*H04W 52/08* (2009.01)
*H04W 52/14* (2009.01)
(Continued)

(52) U.S. Cl.
CPC ......... *H04W 52/143* (2013.01); *H04L 5/0048* (2013.01); *H04L 5/14* (2013.01);
(Continued)

(58) Field of Classification Search
CPC ............. H04W 52/143; H04W 52/247; H04W 52/248; H04W 52/325; H04W 72/042;
(Continued)

(56) References Cited

U.S. PATENT DOCUMENTS

2008/0045260 A1    2/2008  Muharemovic et al.
2010/0113105 A1    5/2010  Xu et al.
(Continued)

OTHER PUBLICATIONS

PCT International Application No. PCT/KR2013/001931, Written Opinion of the International Searching Authority dated Jun. 27, 2013, 1 page.
(Continued)

*Primary Examiner* — Jae Y Lee
*Assistant Examiner* — Aixa Guadalupe-Cruz
(74) *Attorney, Agent, or Firm* — Lee Hong Degerman Kang Waimey

(57) ABSTRACT

In the present invention, disclosed is a method for a terminal, which receives a downlink signal from a first base station and transmits an uplink signal to a second base station, transmitting a sounding reference signal (SRS) in a wireless communication system. More specifically, the method comprises the steps of: receiving from the first base station downlink control information including a triggering message of a first SRS; determining transmission power of the first SRS on the basis of the downlink control information;
(Continued)

and transmitting the first SRS to the first base station with the transmission power that is determined, wherein a transmission power control command field, which is included in the downlink control information, is applied to a closed loop parameter for determining the transmission power of the first SRS.

12 Claims, 9 Drawing Sheets

Related U.S. Application Data filed on Mar. 22, 2012, provisional application No. 61/616,413, filed on Mar. 27, 2012, provisional application No. 61/679,062, filed on Aug. 2, 2012, provisional application No. 61/680,693, filed on Aug. 7, 2012, provisional application No. 61/692,225, filed on Aug. 22, 2012.

(51) Int. Cl.

| | | |
|---|---|---|
| *H04W 52/24* | (2009.01) | |
| *H04W 52/32* | (2009.01) | |
| *H04L 5/00* | (2006.01) | |
| *H04L 5/14* | (2006.01) | |
| *H04W 72/04* | (2009.01) | |
| *H04W 52/16* | (2009.01) | |
| *H04W 52/40* | (2009.01) | |

(52) U.S. Cl.
CPC ......... *H04W 52/08* (2013.01); *H04W 52/146* (2013.01); *H04W 52/247* (2013.01); *H04W 52/248* (2013.01); *H04W 52/325* (2013.01); *H04W 72/042* (2013.01); *H04L 5/001* (2013.01); *H04L 5/0035* (2013.01); *H04L 5/0051* (2013.01); *H04W 52/16* (2013.01); *H04W 52/40* (2013.01)

(58) Field of Classification Search
CPC . H04W 4/00; H04W 52/146; H04W 72/0413; H04W 72/0473; H04W 52/08; H04W 52/265; H04W 52/38; H04W 52/34; H04W 72/0406; H04L 5/14; H04L 5/0048
See application file for complete search history.

(56) References Cited

U.S. PATENT DOCUMENTS

| | | | |
|---|---|---|---|
| 2010/0246561 A1 | 9/2010 | Shin et al. | |
| 2011/0098054 A1* | 4/2011 | Gorokhov | H04B 7/024 455/452.1 |
| 2011/0199944 A1* | 8/2011 | Chen | H04L 5/0007 370/280 |
| 2011/0268028 A1* | 11/2011 | Stern-Berkowitz | H04L 27/2613 370/328 |
| 2012/0039273 A1* | 2/2012 | Nam | H04L 5/0005 370/329 |

OTHER PUBLICATIONS

PCT International Application No. PCT/KR2013/001931, Written Opinion of the International Searching Authority dated Jun. 27, 2013, 15 pages.

\* cited by examiner

FIG. 2
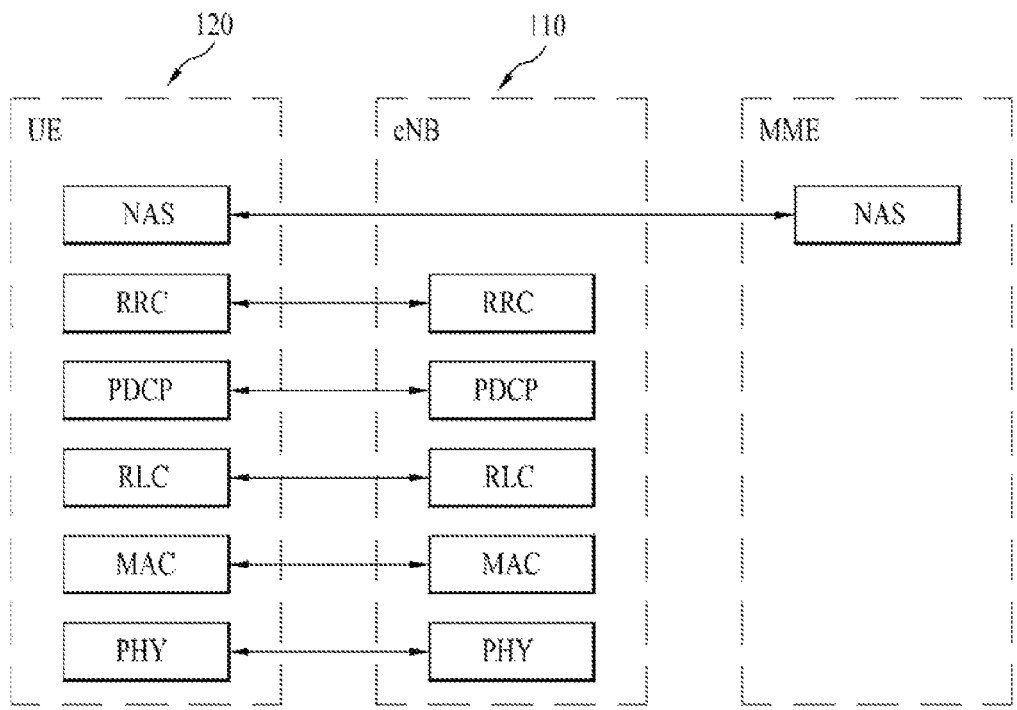
(a) CONTROL PLANE PROTOCOL STACK
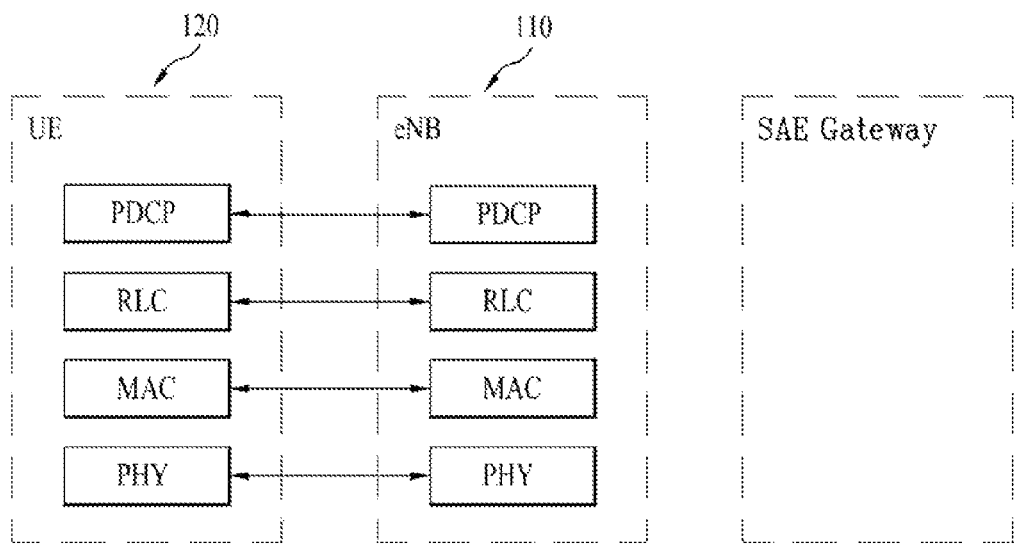
(b) USER PLANE PROTOCOL STACK

METHOD FOR CONTROLLING TRANSMISSION POWER OF SOUNDING REFERENCE SIGNAL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2013/001931, filed on Mar. 11, 2013, which claims the benefit of U.S. Provisional Application Ser. No. 61/612,255, filed on Mar. 17, 2012, 61/614,500, filed on Mar. 22, 2012, 61/616,413, filed on Mar. 27, 2012, 61/679,062, filed on Aug. 2, 2012, 61/680,693, filed on Aug. 7, 2012, and 61/692,225, filed on Aug. 22, 2012, the contents of which are all hereby incorporated by reference herein in their entirety.

TECHNICAL FIELD

The present invention relates to a wireless communication system and, more particularly, to a method for controlling transmission power of a sounding reference signal (SRS) in a wireless communication system and an apparatus therefor.

BACKGROUND ART

A 3rd generation partnership project long term evolution (3GPP LTE, hereinafter referred to as "LTE") communication system is briefly described as an example of a wireless communication system to which the present invention is applicable.

FIG. 1 is a diagram schematically illustrating an evolved universal mobile telecommunications system (E-UMTS) network structure as an example of a wireless communication system. E-UMTS is the next stage in the evolution of UMTS and is currently undergoing standardization in the 3GPP. In general, E-UMTS may be referred to as an LTE system. Release 7 and Release 8 of "3rd Generation Partnership Project; Technical Specification Group Radio Access Network" may be referred to for details of technical specifications of the UMTS and the E-UMTS.

Referring to FIG. 1, the E-UMTS includes a terminal (for example, user equipment (UE)), a base station (for example, an eNode B (eNB)), and an access gateway (AG) positioned at the end of a network (for example, an evolved UMTS terrestrial radio access network (E-UTRAN)) and connected to an external network. The base station may simultaneously transmit multiple data streams for a broadcast service, a multicast service, and/or a unicast service.

A base station includes one or more cells. A cell is set to one of bandwidths such as 1.44, 3, 5, 10, 15, and 20 MHz to provide a downstream or upstream transmission service to several terminals. Different cells may be set to provide different bandwidths. The base station controls data transmission and reception for a plurality of terminals. The base station transmits downlink scheduling information for downlink data to inform a terminal of information about a time/frequency domain in which the data is to be transmitted, decoding, data size, a hybrid automatic repeat and request (HARQ), etc. In addition, the base station transmits uplink scheduling information for uplink data to a terminal to inform the terminal of information about a time/frequency domain available to the terminal, decoding, data size, a HARQ, etc. An interface may be used between base stations to transmit user traffic or control traffic. A core network (CN) may include the AG, a network node for registering a terminal user, etc. The AG manages terminal mobility in a unit of a tracking area (TA) including a plurality of cells.

Even though the wireless communication system has been developed into LTE based on wideband code division multiple access (WCDMA), demands and expectations of users and service providers are continuously increasing. Moreover, since other radio access technologies are continuously being developed, new technological evolution is required to remain competitive in the future. There is a desire for reduction in price per bit, increase in service availability, flexible use of a frequency band, simple structure, open interface, appropriate power consumption of a terminal, etc.

DISCLOSURE

Technical Problem

An object of the present invention devised to solve the problem lies in a method of controlling transmission power of a sounding reference signal (SRS) in a wireless communication system and an apparatus therefor.

Technical Solution

The object of the present invention can be achieved by providing a method for transmitting a sounding reference signal (SRS) by a terminal, the terminal receiving a downlink signal from a first base station and transmitting an uplink signal to a second base station in a wireless communication system, the method including receiving downlink control information including a triggering message for a first SRS from the first base station, determining transmission power of the first SRS based on the downlink control information, and transmitting the first SRS to the first base station with the determined transmission power, wherein the downlink control information includes a transmission power control command field applied to a closed-loop parameter for the determination of the transmission power of the first SRS. Here, the first SRS may be an SRS for acquisition of downlink channel state information. The wireless communication system may be a time division duplex (TDD) system.

The method may further include receiving offset information of the transmission power of the first SRS based on transmission power of an uplink data channel from a higher layer, wherein the offset information reflects a difference in maximum transmission power between the first base station and the second base station.

The method may further include periodically transmitting a second SRS to the second base station. Here, the method may further include receiving offset information of transmission power of the second SRS based on the transmission power of the uplink data channel from the higher layer, wherein the transmission power of the second SRS has a maximum offset less than a maximum offset of the first transmission power.

The downlink control information may be received in a terminal-specific search space. Here, the downlink control information may include a resource allocation field indicating absence of resource allocation. At least one field associated with the resource allocation field may be added to the transmission power control command field.

Alternatively, the transmission power control command field in the downlink control information is applied to a closed-loop parameter for determination of transmission power of an uplink data channel when the downlink control information is received in a common search space.

In another aspect of the present invention, provided herein is a terminal device in a wireless communication system including a reception module for receiving downlink control information including a triggering message for a first SRS from a first base station, a processor for determining transmission power of the first SRS based on the downlink control information, and a transmission module for transmitting the first SRS to the first base station with the determined transmission power, wherein the downlink control information includes a transmission power control command field applied to a closed-loop parameter for the determination of the transmission power of the first SRS.

Here, the terminal device may be positioned in an area in which a downlink signal is received from the first base station and an uplink signal is transmitted to a second base station. The transmission module may periodically transmit a second SRS to the second base station.

Advantageous Effects

According to embodiments of the invention, a terminal may efficiently control transmission power of a sounding reference signal (SRS) in a wireless communication system.

It will be appreciated by persons skilled in the art that that the technical objects that can be achieved through the present invention are not limited to what has been particularly described hereinabove and other technical objects of the present invention will be more clearly understood from the following detailed description.

DESCRIPTION OF DRAWINGS

FIG. 2 is a diagram illustrating configurations of a control plane and a user plane of a radio interface protocol between a terminal and an evolved UMTS terrestrial radio access network (E-UTRAN) based on a 3rd generation partnership project long term evolution (3 GPP) radio network standard.

BEST MODE

Figure 1:
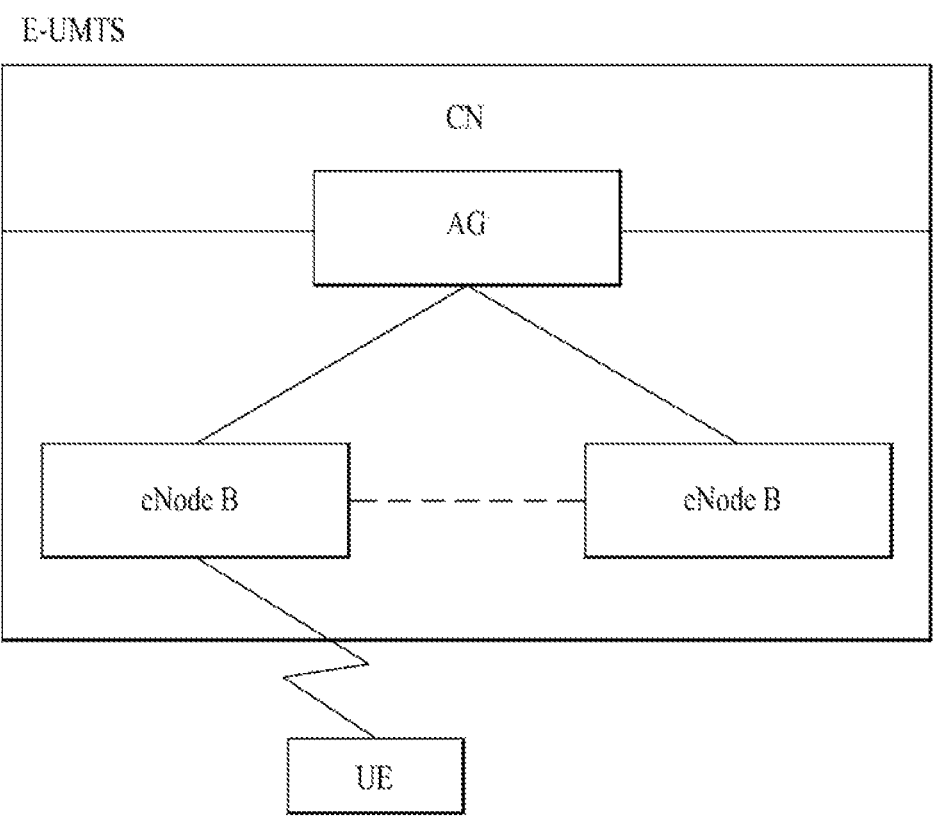
FIG. 1 is a diagram schematically illustrating an evolved universal mobile telecommunications system (E-UMTS) network structure as an example of a wireless communication system.

Hereinafter, a structure, effects, and characteristics of the present invention will be easily understood by embodiments of the present invention described with reference to the accompanying drawings. The embodiments described below are examples in which technical characteristics of the present invention are applied to a 3rd generation partnership project long term evolution (3GPP) system.

This specification describes the embodiments of the present invention using a long term evolution (LTE) system, and an LTE-advanced (LTE-A) system. However, the embodiments are merely examples, and the embodiments of the present invention may be applied to any communication system corresponding thereto. In addition, in this specification, the term "base station" is used as a comprehensive term including a remote radio head (RRH), a transmission point (TP), a reception point (RP), an eNB, a relay, etc.

FIG. 2 is a diagram illustrating configurations of a control plane and a user plane of a radio interface protocol between a terminal and an evolved universal mobile telecommunications system (UMTS) terrestrial radio access network (E-UTRAN) based on 3GPP radio network standard. The control plane refers to a path for transmitting a control message used for user equipment (UE) and a network to manage a call. The user plane refers to a path for transmitting data generated in an application layer, for example, audio data or Internet packet data.

A physical layer corresponding to a first layer provides an information transfer service to a higher layer using a physical channel. The physical layer is connected to a medium access control (MAC) layer positioned on the upper side thereof through a transmission channel (a transmission antenna port channel). Data moves between the MAC layer and the physical layer through the transmission channel. Data moves between physical layers of a transmitter and a receiver through a physical channel. The physical channel uses time and frequency as radio resources. Specifically, the physical channel is modulated by an orthogonal frequency division multiple access (OFDMA) scheme in downlink, and is modulated by a single carrier frequency division multiple access (SC-FDMA) scheme in uplink.

The MAC layer of a second layer provides a service to a radio link control (RLC) layer corresponding to a higher layer through a logical channel. The RLC layer of the second layer supports reliable data transmission. A function of the RLC layer may be implemented by a functional block within the MAC layer. A packet data convergence protocol (PDCP) layer of the second layer performs a header compression function for reducing unnecessary control information to efficiently transmit an Internet protocol (IP) packet such as Internet protocol version 4 (IPv4) and Internet protocol version 6 (IPv6) in a radio interface having a small bandwidth.

A radio resource control (RRC) layer positioned in a lowermost portion of a third layer is defined only in the control plane. The RRC layer controls a logical channel, a transmission channel, and a physical channel relevant to configuration, reconfiguration, and release of a radio bearer (RB). The RB refers to a service provided by the second layer for data transfer between a terminal and a network. To achieve this, RRC messages are exchanged between the terminal and the RRC layer of the network. When the terminal and the RRC layer of the network are connected (RRC connected), the terminal is in an RRC connected mode. Otherwise, the terminal is in an RRC idle mode. A non-access stratum (NAS) layer positioned on the upper side of the RRC layer performs a function such as session management, mobility management, etc.

A cell included in a base station (for example, an eNB) is set to one of bandwidths such as 1.44, 3, 5, 10, 15, and 20

MHz to provide a downstream or upstream transmission service to several terminals. Different cells may be set to provide different bandwidths.

Examples of a downstream transmission channel for transmitting data from a network to a terminal include a broadcast channel (BCH) for transmitting system information, a paging channel (PCH) for transmitting a paging message, a downstream shared channel (SCH) for transmitting user traffic or control messages, etc. Traffic or control messages of a downstream multicast or broadcast service may be transmitted through the downstream SCH, or may be transmitted through a separate downstream multicast channel (MCH). On the other hand, examples of an upstream transmission channel for transmitting data from a terminal to a network include a random access channel (RACH) for transmitting an initial control message, and an upstream SCH for transmitting user traffic or a control message. Examples of a logical channel positioned on the upper side of a transmission channel and mapped to the transmission channel include a broadcast control channel (BCCH), a paging control channel (PCCH), a common control channel (CCCH), a multicast control channel (MCCH), a multicast traffic channel (MTCH), etc.

Figure 3:
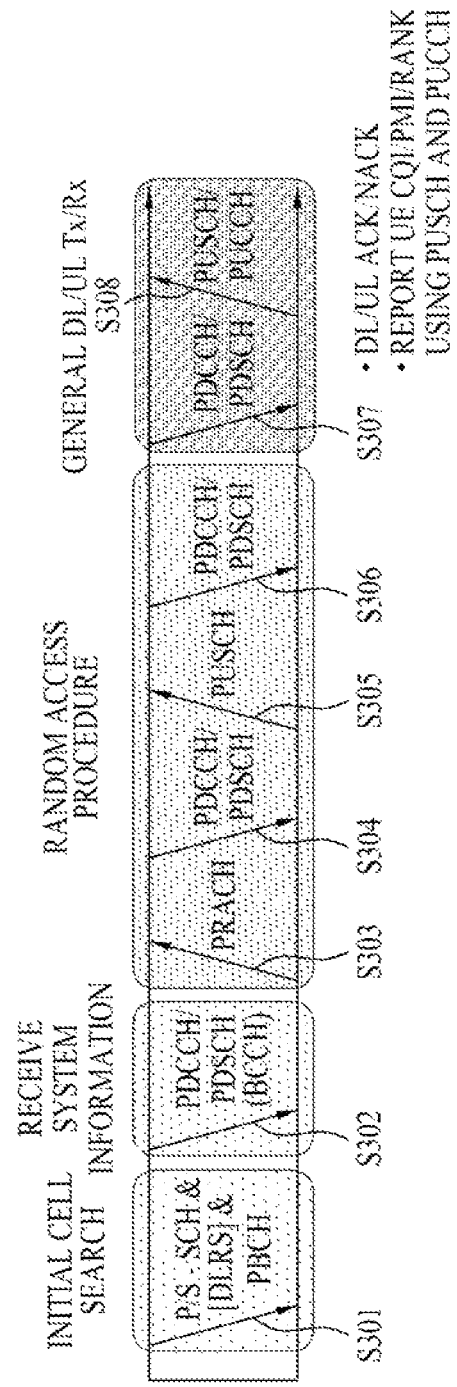
FIG. 3 is a diagram illustrating physical channels used for a 3GPP system and a general signal transmission scheme using the physical channels.

FIG. 3 is a diagram illustrating physical channels used for a 3GPP system and a general signal transmission scheme using the physical channels.

In S301, a terminal performs an initial cell search procedure, for example, a procedure of synchronizing with a base station when the terminal is turned on or newly enters a cell. To achieve this, the terminal receives a primary synchronization channel (P-SCH) and a secondary synchronization channel (S-SCH) from the base station to be synchronized with the base station, and may acquire information such as a cell identifier (ID). Thereafter, the terminal may acquire inner-cell broadcast information by receiving a physical broadcast channel from the base station. Meanwhile, the terminal may verify a downlink channel state by receiving a downlink reference signal (DL RS) in an initial cell search step.

In S302, the terminal finishing the initial cell search procedure may acquire more specific system information by receiving a physical downlink control channel (PDCCH), and a physical downlink shared channel (PDSCH) according to information included in the PDCCH.

When the terminal initially accesses the base station, or a radio resource for signal transmission is absent, the terminal may perform a random access procedure with respect to the base station in S303 through S306. To achieve this, the terminal may transmit a particular sequence as a preamble through a physical random access channel (PRACH) in S303 and S305, and may receive a response message for the preamble through the PDCCH and the corresponding PDSCH in S304 and S306. A contention resolution procedure may be additionally performed for a contention based RACH.

Thereafter, the terminal performing the above-described procedures may receive the PDCCH/PDSCH in S307, and transmit a physical uplink shared channel (PUSCH)/physical uplink control channel (PUCCH) in S308 as a general up/downlink signal transmission procedure. In particular, the terminal receives downlink control information (DCI) through the PDCCH. Here, the DCI includes control information such as resource allocation information for a terminal, and has different formats depending on the purpose of use.

Meanwhile, control information transmitted by the terminal to the base station through an uplink, or received by the terminal from the base station includes a downlink/uplink acknowledgement (ACK)/negative acknowledgement (NACK) signal, a channel quality indicator (CQI), a precoding matrix index (PMI), a rank indicator (RI), etc. In the 3GPP LTE system, the terminal may transmit the above-described control information such as the CQI, the PMI, the RI, etc. through the PUSCH and/or the PUCCH.

Figure 4:
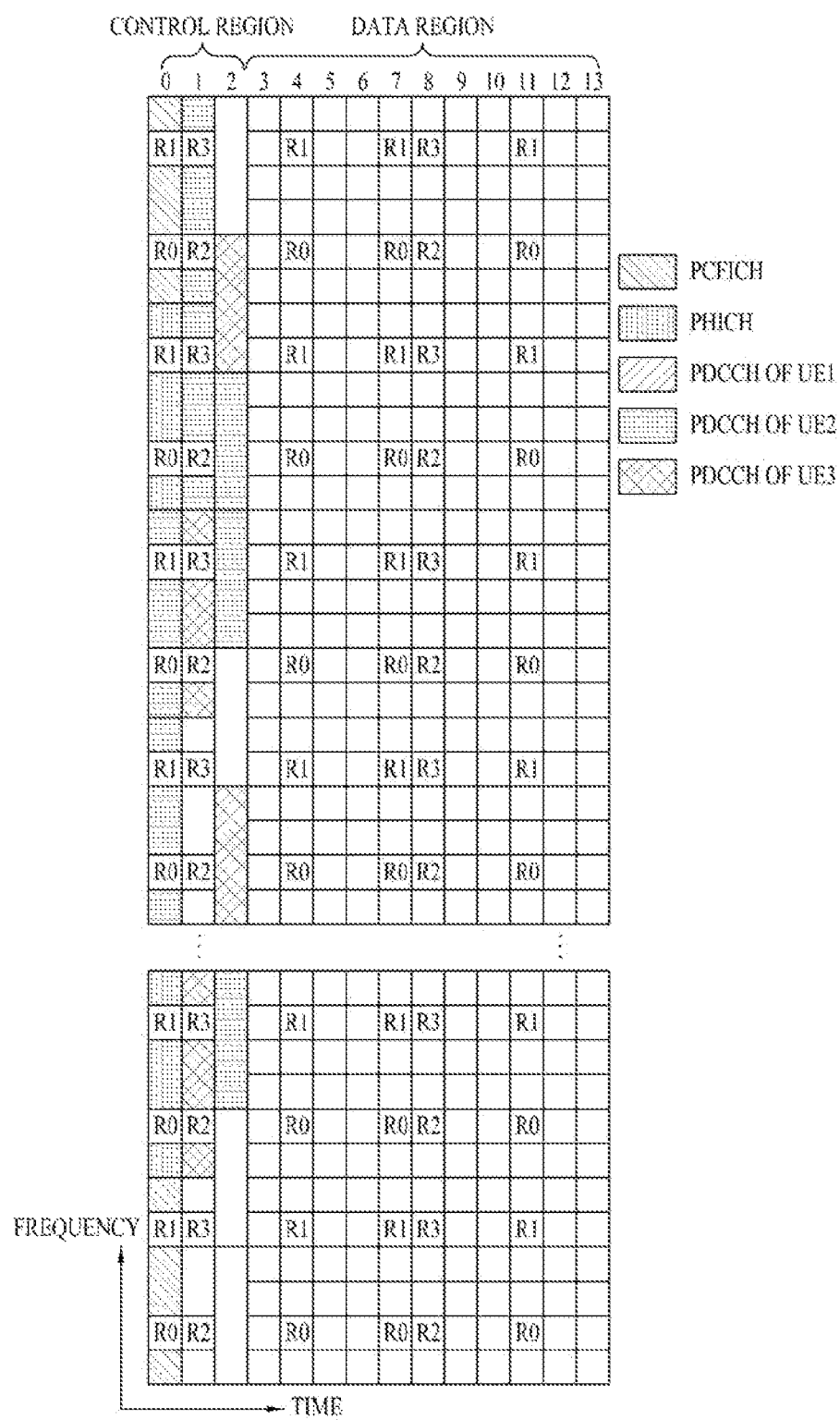
FIG. 4 is a diagram illustrating a structure of a downlink radio frame used in a long term evolution (LTE) system.

FIG. 4 is a diagram illustrating a control channel included in a control region of a subframe in a downlink radio frame.

Referring to FIG. 4, the subframe includes 14 orthogonal frequency division multiplexing (OFDM) symbols. One to three initial OFDM symbols are used as a control region, and remaining 11 to 13 OFDM symbols are used as a data region according to subframe setting. R1 to R4 of FIG. 4 denote reference signals (RSs) (or pilot signals) for antennas 0 to 3, respectively. RSs are fixed in a constant pattern within a subframe irrespective of the control region and the data region. The control channel is allocated to a resource excluding an RS in the control region, and a traffic channel is allocated to a resource excluding an RS in the data region. Examples of the control channel allocated to the control region include a physical control format indicator channel (PCFICH), a physical hybrid-ARQ indicator channel (PHICH), a physical downlink control channel (PDCCH), etc.

The PCFICH is a physical control format indicator channel, and informs the terminal of the number of OFDM symbols used for the PDCCH for each subframe. The PCFICH is positioned in a first OFDM symbol, and is set prior to the PHICH and the PDCCH. The PCFICH includes four resource element groups (REGs), and the respective REGs are dispersed within the control region based on a cell ID. An REG includes four resource elements (REs). An RE indicates a minimum physical resource defined as a subcarrier multiplied by an OFDM symbol. Values of the PCFICH indicate values of 1 to 3, or 2 to 4 depending on bandwidth, and are modulated by quadrature phase shift keying (QPSK).

The PHICH is a hybrid-automatic repeat and request (HARQ) indicator channel, and is used to carry an HARQ ACK/NACK for uplink transmission. That is, the PHICH indicates a channel for transmitting downlink ACK/NACK information for uplink HARQ. The PHICH includes an REG and is cell-specifically scrambled. The ACK/NACK is indicated by a bit and is modulated by binary phase shift keying (BPSK). The modulated ACK/NACK is spread by a spreading factor (SF) of 2 or 4. A plurality of PHICHs mapped to the same resource constitute a PHICH group. The number of multiplexed PHICHs in the PHICH group is determined based on the number of spreading codes. The PHICH (group) is repeated three times to obtain a diversity gain in the frequency domain and/or the time domain.

The PDCCH is a physical downlink control channel, and is allocated to n initial OFDM symbols of a subframe. Here, n denotes an integer greater than or equal to 1, and is indicated by the PDFICH. The PDCCH includes one or more control channel elements (CCEs). The PDCCH informs each terminal or a terminal group of information about resource allocation of a downlink-shared channel (DL-SCH) and a PCH corresponding to a transmission channel, an uplink scheduling grant, HARQ information, etc. The PCH and the DL-SCH are transmitted through the PDSCH. Therefore, in general, each of a base station and a terminal transmits and receives data through the PDSCH except for particular control information or particular service data.

Information about a terminal (one or a plurality of terminals) to which data of the PDSCH is transmitted, information about a scheme for the terminal to receive and decode the PDSCH data, etc. are included in the PDCCH and transmitted. For example, it is presumed that a particular PDCCH is cyclic redundancy check (CRC)-masked by a radio network temporary identifier (RNTI) referred to as "A", and information about data transmitted using a radio resource (for example, a frequency location) referred to as "B" and transmission form information (for example, a transmission block size, modulation scheme, coding information, etc.) referred to as "C" is transmitted in a particular subframe. In this case, a terminal within a cell monitors the PDCCH using RNTI information included in the terminal. When one or more terminals include the RNTI "A", the terminals receive the PDCCH, and receive the PDSCH indicated by "B" and "C" using information about the received PDCCH.

Figure 5:
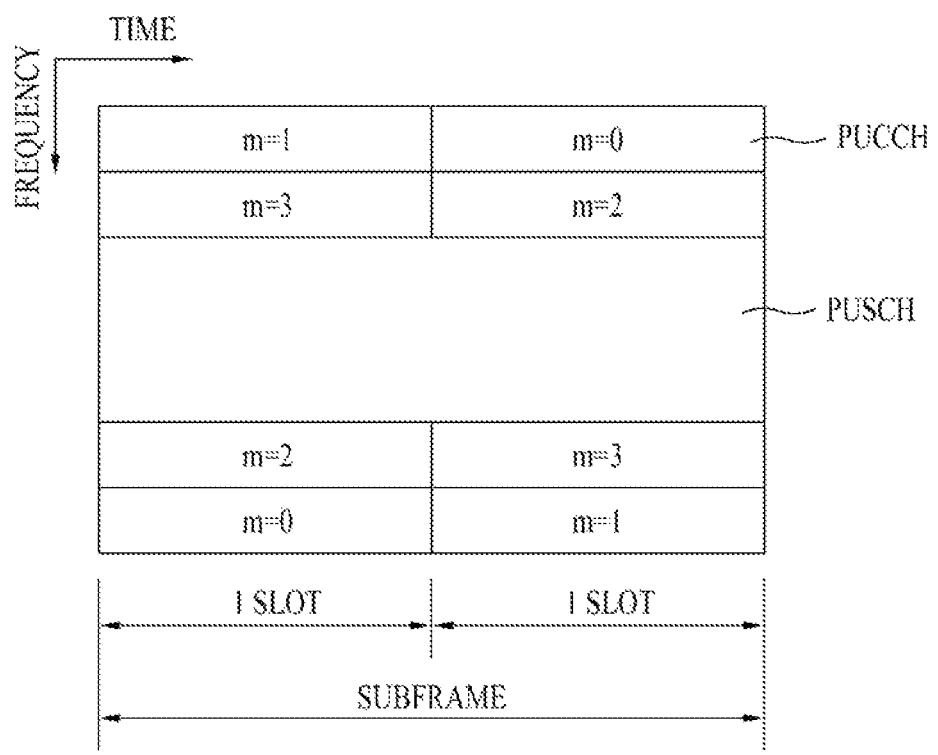
FIG. 5 is a diagram illustrating a structure of an uplink subframe used in an LTE system.

FIG. 5 is a diagram illustrating a structure of an uplink subframe used in an LTE system.

Referring to FIG. 5, the uplink subframe may be divided into a region to which a PUCCH carrying control information is allocated, and a region to which a PUSCH carrying user data is allocated. A center portion of the subframe is allocated to the PUSCH, and both sides of a data region in the frequency domain are allocated to the PUCCH. The control information transmitted on the PUCCH includes ACK/NACK used for HARQ, a CQI indicating a downlink channel state, an RI for multiple-input multiple-output (MIMO), a scheduling request (SR) corresponding to a request for uplink resource allocation, etc. A PUCCH for a terminal uses a resource block occupying different frequencies in respective slots within the subframe. That is, two resource blocks allocated to a PUCCH are frequency-hopped at a slot boundary. In particular, FIG. 5 illustrates that a PUCCH corresponding to m=0, a PUCCH corresponding to m=1, a PUCCH corresponding to m=2, and a PUCCH corresponding to m=3 are allocated to the subframe.

In addition, a sounding reference signal (SRS) within a subframe may be transmitted in a time period including a symbol positioned in a last portion on a time axis in the subframe, and is transmitted in a data transmission band on a frequency. SRSs of several terminals transmitted to the last symbol in the same subframe may be distinguished according to frequency locations.

Figure 6:
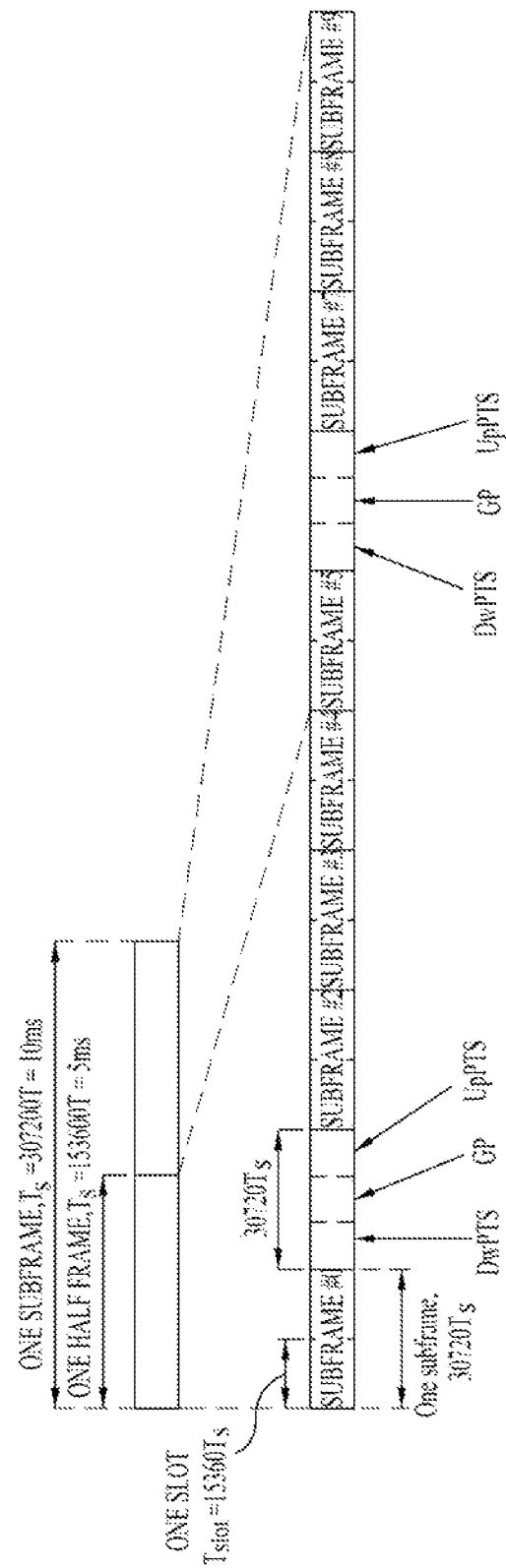
FIG. 6 is a diagram illustrating a structure of a radio frame in an LTE-time division duplex (TDD) system.

FIG. 6 is a diagram illustrating a structure of a radio frame in an LTE-time division duplex (TDD) system. In the LTE TDD system, the radio frame includes two half frames, and each half frame includes four general subframes having two slots, and a special subframe having a downlink pilot time slot (DwPTS), a guard period (GP), and an uplink pilot time slot (UpPTS).

In the special subframe, the DwPTS is used for initial cell search, synchronization, or channel estimation in a terminal. The UpPTS is used for channel estimation, and synchronization of uplink transmission of a terminal in a base station. That is, the DwPTS is used for downlink transmission, and the UpPTS is used for uplink transmission. In particular, the UpPTS is used for transmission of a PRACH preamble or an SRS. In addition, the GP is a period for cancelling interference occurring in uplink due to multipath delay of a downlink signal between uplink and downlink.

Meanwhile, in the LTE TDD system, uplink/downlink subframe setting (uplink-downlink configuration) is shown in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, "D" denotes a downlink subframe, "U" denotes an uplink subframe, and "S" denotes the special subframe. In addition, Table 1 shows a downlink-to-uplink switch-point periodicity in the uplink/downlink subframe setting in each system.

The LTE-A system corresponding to a standard of a next generation mobile communication system is expected to support a Coordinated Multi-Point (CoMP) transmission scheme which is not supported by existing standards to enhance data transfer rate. Here, the CoMP transmission scheme refers to a transmission scheme enabling two or more base stations or cells to cooperatively communicate with a terminal to enhance communication performance between a terminal and a base station (a cell or a sector) in a shadow area.

The CoMP transmission scheme may be divided into a CoMP joint processing (CoMP-JP) scheme having a cooperative MIMO form using data sharing, and a CoMP-Coordinated Scheduling/beamforming (CoMP-CS/CB) scheme.

In downlink, a terminal may instantaneously and simultaneously receive data from respective base stations performing the CoMP transmission scheme, and may combine signals received from the respective base stations to enhance reception performance in the CoMP-JP scheme (Joint Transmission). In addition, one of the base stations performing the CoMP transmission scheme may transmit data to the terminal at a specific point in time (Dynamic Point Selection). On the other hand, in the CoMP-CS/CB scheme, a terminal may instantaneously receive data using beamforming through a base station, that is, a serving base station.

In uplink, each base station may simultaneously receive a PUSCH signal from a terminal in the CoMP-JP scheme (Joint Reception). On the other hand, only one base station receives a PUSCH signal in the CoMP-CS/CB scheme. In this instance, cooperative cells (or base stations) determine whether to use the CoMP-CS/CB scheme.

Hereinafter, a carrier aggregation scheme is described.

Figure 7:
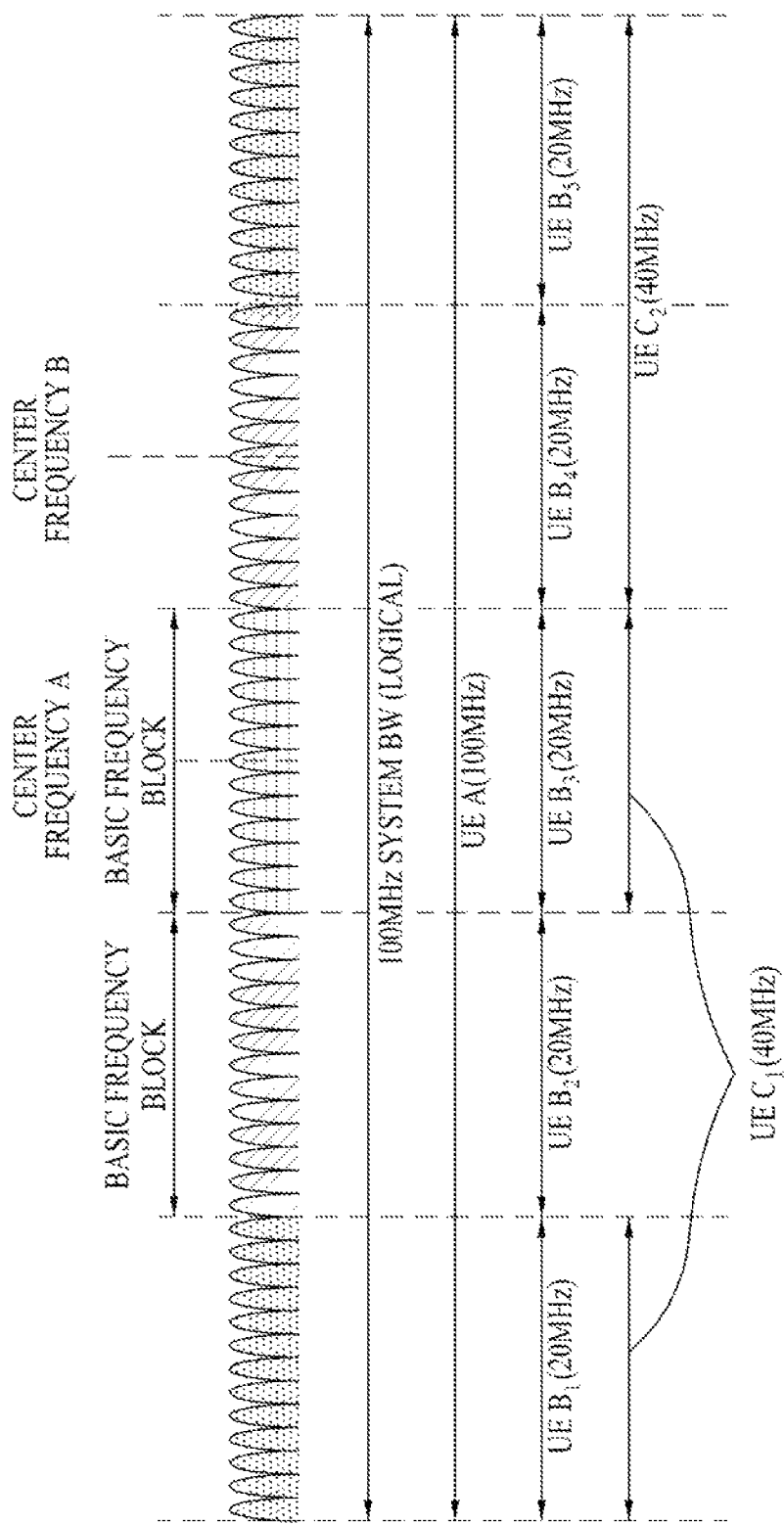
FIG. 7 is a conceptual diagram illustrating a carrier aggregation scheme.

FIG. 7 is a conceptual diagram illustrating carrier aggregation.

Carrier aggregation refers to a scheme in which a terminal uses a plurality of frequency blocks or (logical) cells including an uplink resource (or a component carrier) and/or a downlink resource (or a component carrier) as a large logical frequency bandwidth to enable a wireless communication system to use a wider frequency band. Hereinafter, the term "component carrier" is used for convenience of description.

Referring to FIG. 7, the entire system bandwidth has a maximum bandwidth of 100 MHz as a logical bandwidth. The entire system bandwidth includes five component carriers, and each of the component carriers has a maximum bandwidth of 20 MHz. A component carrier includes one or more physically contiguous subcarriers. FIG. 7 illustrates that the respective component carriers have the same bandwidth. However, the respective component carriers may have different bandwidths. In addition, the respective component carriers are depicted as being adjacent to each other in the frequency domain. However, FIG. 7 illustrates a logical concept, and the respective component carriers may be physically adjacent to each other, or may be separated from each other.

Different center frequencies may be used for the respective component carriers, and a common center frequency may be used for component carriers physically adjacent to each other. For example, referring to FIG. 8, a center frequency A may be used on the assumption that all component carriers are physically adjacent to each other. In addition, the center frequency A, a center frequency B, etc. may be separately used for respective component carriers on the assumption that the respective component carriers are not physically adjacent to each other.

In this specification, a component carrier may correspond to a system bandwidth of a legacy system. When a component carrier is defined based on a legacy system, backward compatibility is easily provided and system design is easily performed in a wireless communication environment including both an evolved terminal and a legacy terminal. For example, when the LTE-A system supports carrier aggregation, each component carrier may correspond to a system bandwidth of the LTE system. In this case, a component carrier may have one of bandwidths including 1.25, 2.5, 5, 10 and 20 MHz.

When the entire system bandwidth is extended through carrier aggregation, a frequency bandwidth used to communicate with each terminal is defined in a unit of component carrier. A terminal A may use 100 MHz corresponding to the entire system band and perform communication using all of five component carriers. Terminals $B_1$ to $B_5$ may use only a bandwidth of 20 MHz, and perform communication using one component carrier. Terminals $C_1$ and $C_2$ may use a bandwidth of 40 MHz, and perform communication using two component carriers. The two component carriers may or may not be logically/physically adjacent to each other. The terminal $C_1$ represents a case in which two non-adjacent component carriers are used, the terminal $C_2$ represents a case in which two adjacent component carriers are used.

While the LTE system uses a downlink component carrier and an uplink component carrier, the LTE-A system may use several component carriers as shown in FIG. 6. In this instance, a scheme for a control channel to schedule a data channel may be divided into an existing linked carrier scheduling scheme and a cross carrier scheduling scheme.

More specifically, in the linked carrier scheduling scheme, a control channel transmitted through a particular component carrier only schedules a data channel through the particular component carrier as in the existing LTE system using a single component carrier.

On the other hand, in the cross carrier scheduling scheme, a control channel transmitted through a primary component carrier using a carrier indicator field (CIF) schedules a data channel transmitted through the primary component carrier or transmitted through another component carrier.

Hereinafter, a method of controlling uplink transmission power in the LTE system is described.

A method of controlling, by a terminal, uplink transmission power of the terminal includes open loop power control (OLPC) and closed-loop power control (CLPC). OLPC serves to control power by estimating and compensating for downlink signal attenuation from a base station of a cell including a terminal, and controls uplink power by increasing uplink transmission power when a distance between the terminal and the base station increases and thus signal attenuation of a downlink increases. CLPC controls uplink power by directly transmitting information (that is, a control signal) used to adjust uplink transmission power in a base station.

Equation 1 below is an equation for determining transmission power of a terminal when a serving cell C only transmits a PUSCH rather than simultaneously transmitting both a PUSCH and a PUCCH in a subframe index i in a system supporting carrier aggregation.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$ [Equation 1]

Equation 2 below is an equation for determining PUSCH transmission power when the subframe index i of the serving cell C simultaneously transmits a PUCCH and a PUSCH in a system supporting carrier aggregation.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$ [Equation 2]

Hereinafter, parameters described with reference to Equation 1 and Equation 2 determine uplink transmission power of a terminal in the serving cell C. Here, $P_{CMAX,c}(i)$ of Equation 1 represents maximum power available for transmission of a terminal in the subframe index i, and $\hat{P}_{CMAX,c}(i)$ of Equation 2 represents a linear value $P_{CMAX,c}(i)$. $\hat{P}_{PUCCH}(i)$ of Equation 2 represents a linear value $P_{PUCCH}(i)$ Here, $P_{PUCCH}(i)$ represents PUCCH transmission power in the subframe index i.

In Equation 1, $M_{PUSCH,c}(i)$ represents a parameter indicating a bandwidth of PUSCH resource allocation expressed by the number of valid resource blocks for the subframe index i, and is a value allocated by a base station. $P_{O\_PUSCH,c}(i)$ is a parameter generated by adding a cell-specific nominal component $P_{O\_NOMINAL\_PUSCH,c}(j)$ provided from a higher layer to a terminal-specific component $P_{O\_UE\_PUSCH,c}(j)$ provided from a higher layer, and is a value that a base station reports to a terminal.

j is 1 for PUSCH transmission/retransmission according to an uplink grant, and j is 2 for PUSCH transmission/retransmission according to a random access response. In addition, equations $P_{O\_NOMINAL\_PUSCH,c}$ (2)=0 and $P_{O\_NOMINAL\_PUSCH,c}(2)=P_{O\_PRE}+\Delta_{PREAMBLE\_Msg3}$ are satisfied, and parameters $P_{O\_PRE}$ and $\Delta_{PREAMBLE\_Msg3}$ are signaled in a higher layer.

$\alpha_c(j)$ is a path loss compensation factor, and is a cell-specific parameter provided by a higher layer and transmitted by a base station as 3 bits. $\alpha$ corresponds to one of 0, 0.4, 0.5, 0.6, 0.7, 0.8, 0.9, and 1 when j is 0 or 1, and $\alpha_c(j)$ is 1 when j is 2. $\alpha_c(j)$ is a value that a base station reports to a terminal.

A path loss $PL_c$ is an estimate of a downlink path loss (or a signal loss) calculated in a unit of dB by a terminal, and is expressed by $PL_c$=referenceSignalPower−higher layer filteredRSRP. Here, a base station may inform a terminal of referenceSignalPower through a higher layer.

$\Delta_{TF,c}(i)$ is determined based on $K_S$ corresponding to a higher layer parameter of each serving cell. Here, $\Delta_{TF,c}(i)=10 \log_{10}((2^{BPRE \cdot K_s}-1) \cdot (\beta_{offset}^{PUSCH})$ is satisfied when $K_S$ is 1.25, and $\Delta_{TF,c}(i)=0$ is satisfied when $K_S$ is 0. Equations for calculating BPRE and $\beta_{offset}^{PUSCH}$ are omitted.

$f_c(i)$ is a value indicating a current PUSCH power control adjustment state for the subframe index i, and may be expressed as a current absolute value or an accumulated value. When accumulation is enabled based on a parameter provided from a higher layer, or when a transmit power control (TPC) command $\delta_{PUSCH,c}$ is included in a PDCCH together with DCI format 0 for a serving cell C scrambled by a temporary C-RNTI, an equation $f_c(i)=f_c(i-1)+\delta_{PUSCH,c}(i-K_{PUSCH})$ is satisfied. $\delta_{PUSCH,c}(i-K_{PUSCH})$ is signaled to a PDCCH together with DCI format 0/4 or 3/3A in a subframe $i-K_{PUSCH}$ Here, $f_c(0)$ is an initial value after an accumulated value is reset.

A value $K_{PUSCH}$ is defined as below in an LTE standard.

A value $K_{PUSCH}$ is 4 for frequency division duplex (FDD). For TDD, a value $K_{PUSCH}$ is as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Except for a case of a DRX state, a terminal attempts to decode a PDCCH of DCI format 0/4 using a C-RNTI of the terminal or DCI format for an SPS C-RNTI and a PDCCH of DCI format 3/3A using a TPC-PUSCH-RNTI of the terminal in each subframe. When DCI format 0/4 and DCI format 3/3A for a serving cell C are detected in the same subframe, a terminal uses $\delta_{PUSCH,c}$ provided in DCI format 0/4. $\delta_{PUSCH,c}$ is 0 dB for a subframe in which a TPC command decoded for the serving cell C is absent, a DRX is generated, or a subframe having an index i is not an uplink subframe in TDD.

A $\delta_{PUSCH,c}$ accumulated value signaled on the PDCCH together with DCI format 0/4 is as shown in Table 3 below. $\delta_{PUSCH,c}$ is 0 dB when the PDCCH together with DCI format 0 is validated by SPS activation, or the PDCCH is released. A $\delta_{PUSCH,c}$ accumulated value signaled on the PDCCH together with DCI format 3/3A corresponds to a SET1 of Table 3 below, or a SET2 of Table 4 determined by a TPC-index parameter provided in a higher layer.

TABLE 3

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH, c}$ [dB] |
|---|---|
| 0 | −1 |
| 1 | 1 |

When a terminal reaches a maximum transmission power $\hat{P}_{CMAX}(i)$ in the serving cell C, a positive TPC command is not accumulated for the serving cell C. On the other hand, when a terminal reaches a minimum maximum power, a negative TPC command is not accumulated.

Equation 3 below is an equation related to control of uplink power for a PUCCH in the LTE system.

$$P_{PUCCH}(i) = \min \begin{Bmatrix} P_{CMAX,c}(i), \\ P_{O\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \quad \text{[Equation 3]}$$

In Equation 3, i denotes a subframe index, and c denotes a cell index. When a terminal is set by a higher layer to transmit a PUCCH on two antenna ports, a value $\Delta_{TxD}$ (F') is provided to the terminal by the higher layer, and 0 is provided otherwise. A parameter described below is a parameter for a serving cell having a cell index C.

Here, $P_{CMAX,c}(i)$ indicates maximum power that may be transmitted by a terminal, $P_{O\_PUCCH}$ is a parameter including a sum of cell-specific parameters, and is reported by a base station through higher layer signaling, and is an estimate of downlink path loss (or signal loss) calculated by a terminal in dB, and is expressed by $PL_c$=referenceSignalPower−higher layer filteredRSRP. h(n) is a variable depending on a PUCCH format, $n_{CQI}$ is the number of information bits for CQI, and $n_{HARQ}$ indicates the number of HARQ bits. A value $\Delta_{F\_PUCCH}$(F) is a relative value with respect to a PUCCH format 1a, and is a value reported by a base station through higher layer signaling as a value corresponding to a PUCCH format #F. g(i) indicates a current PUCCH power control adjustment state of a subframe index i.

When a value $P_{O\_UE\_PUCCH}$ is changed in a higher layer, an equation g(0)=0 is satisfied. Otherwise, an equation $g(0)=\Delta P_{rampup}+\delta_{msg2}$ is satisfied. $\delta_{msg2}$ is a TPC command indicated in a random access response, and $\Delta P_{rampup}$ corresponds to a total power ramp-up from first to last preambles provided by a higher layer.

When a terminal reaches transmission maximum power $P_{CMAX,c}(i)$ in a primary cell, a positive TPC command is not accumulated for the primary cell. On the other hand, when a terminal reaches minimum power, a negative TPC command is not accumulated. A terminal resets accumulation when a value $P_{O\_UE\_PUCCH}$ is changed by a higher layer, or a random access response message is received.

Meanwhile, Tables 5 and 6 below show values of $\delta_{PUCCH}$ indicated by a TPC command field in DCI formats. In particular, Table 5 shows values of $\delta_{PUCCH}$ indicated by DCI formats other than DCI format 3A, and Table 6 shows values of $\delta_{PUCCH}$ indicated by DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 below is an equation related to control of power of an SRS in the LTE system.

$$P_{SRS,c}(i) = \min \begin{Bmatrix} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{Bmatrix} [dBm] \quad \text{[Equation 4]}$$

In Equation 4, i denotes a subframe index and C denotes a cell index. Here, $P_{CMAX,c}(i)$ indicates maximum power that may be transmitted by a terminal, and $P_{SRS\_OFFSET,c}(m)$ indicates a value set to a higher layer, corresponds to a case of transmitting a periodic SRS when m is 0, and corresponds to a case of transmitting an aperiodic SRS when m is 1. $M_{SRS,c}$ denotes an SRS bandwidth in a subframe index i of a serving cell C, and is expressed by the number of resource blocks.

$f_c(i)$ denotes a value indicating a current PUSCH power control adjustment state for a subframe index i of a serving cell C, and $P_{O\_PUSCH,c}(j)$ and $\alpha_c(j)$ are as described in Equations 1 and 2.

However, the above-described conventional uplink power scheme does not sufficiently consider cooperative communication between base stations, that is, the wireless communication system employing the CoMP scheme. For example, according to the conventional uplink power control scheme, each terminal only considers signal attenuation from a base station (for example, an S-eNB) of a cell including the terminal in OLPC, and assumes that a control signal is received from a base station of a cell including the terminal in CLPC. Therefore, it is inefficient to apply the conventional uplink power control scheme without change to an environment in which an uplink signal is received and decoded through cooperation among several base stations.

As a similar case, for example, a PUCCH scheduled by a PDCCH received from eNB#1 may reduce uplink power, and may be transmitted to eNB#2 in terms of mitigating interference. Similarly, a PUSCH scheduled by a PDCCH received from eNB#1 may be transmitted to eNB#2 having a different cell identifier.

In particular, in a TDD system in which a downlink channel is estimated using an SRS due to symmetry between an uplink channel and a downlink channel, an SRS targeting a downlink transmission point may be different from an SRS targeting an uplink reception point. In this case, the SRS targeting a downlink transmission point and the SRS targeting an uplink reception point need to undergo different transmission power control operations. Hereinafter, details of this operation will be described with reference to drawings.

Figure 8:
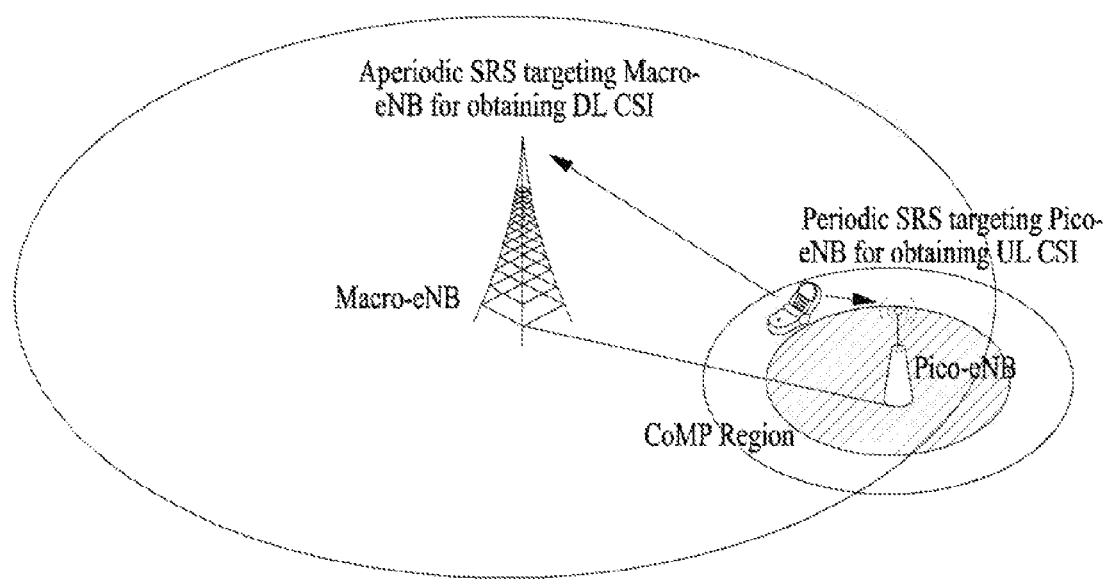
FIG. 8 is a diagram illustrating a case of transmitting a sounding reference signal (SRS) in a wireless communication system employing a Coordinated Multi-Point (CoMP) scheme.

FIG. 8 is a diagram illustrating a case of transmitting an SRS in a wireless communication system employing a CoMP scheme.

FIG. 8 illustrates that an SRS targeting the Macro-eNB to acquire downlink CSI by a terminal is transmitted in the form of an aperiodic SRS (A-SRS), and an SRS targeting the Pico-eNB to acquire uplink CSI is transmitted in the form of a periodic SRS (P-SRS). A UE benefits from frequent uplink transmission targeting the Pico-eNB close to the UE when heavy uplink traffic is present, and an SRS for acquiring uplink CSI supporting the transmission is periodically transmitted to smoothly perform link adaptation of a PUSCH. On the other hand, when relatively little downlink traffic is present and an SRS for acquiring downlink CSI is transmitted as an A-SRS using intermittent aperiodic triggering each time buffered downlink data is present, the downlink CSI is sufficiently acquired.

More specifically, when uplink transmission is performed toward the Pico-eNB, an A-SRS is transmitted to the Pico-eNB to have a difference corresponding to $P_{SRS\_OFFSET,c}$ (1) with respect to PUSCH transmission power as in the existing LTE system. However, when the CoMP scheme is employed as in FIG. 8, it is necessary to transmit an A-SRS to the Pico-eNB with lower power than power for transmitting a P-SRS to the Macro-eNB corresponding to a downlink signal transmission point in the TDD system in which downlink CSI is acquired using an SRS based on symmetry between an uplink channel and a downlink channel.

The present invention proposes a method for controlling power for an A-SRS separately from PUSCH power control under a circumstance in which power control of a P-SRS is generally linked to power control of a particular PUSCH. Further, when a plurality of settings are present for an A-SRS, a separate power control method needs to be applied according to each of the settings, which will be described below.

First Embodiment

A first embodiment of the present invention proposes a method in which $f_c(i)$ corresponding to a closed-loop power control parameter, that is, a TPC command field is applied differently from power control of a P-SRS as a method of controlling power for an A-SRS separately from power control of a P-SRS. That is, a TPC command field is used as $f_c(i)$ corresponding to a closed-loop power control parameter which is independent from an A-SRS.

More specifically, an operation is performed such that a TPC field of DCI including a triggering message for a particular A-SRS only affects power control of the A-SRS and is not applied to power control of a PUCCH or power control of a PUSCH scheduled in the DCI. Information about whether to activate the operation is indicated using a higher-layer signal such as an RRC-layer signal. It is preferable that the operation be applied to the DCI received after the higher-layer signal is received.

In this instance, the higher-layer signal which indicates whether to activate the operation may be a predetermined field having a size of 1 bit. Here, the higher-layer signal may only indicate whether to activate or deactivate the operation. In this case, it may be agreed that an inactive state corresponds to an existing operation, and an active state activates the operation for all A-SRS triggering before the inactive state is indicated again thereafter.

Alternatively, the higher-layer signal may be a predetermined field having a size of 2 bits. In this case, a default state or a fallback state indicating the inactive state is present, and the other states may separately indicate an active state of the operation for each particular A-SRS setting.

For example, a 3GPP standard document defines A-SRS parameter sets as shown in Table 7 below.

TABLE 7

| Value of SRS request field | Description |
|---|---|
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

In particular, according to the 3GPP standard document, A-SRS triggering bits having a size of 2 bits are present in DCI format 4 corresponding to an uplink grant, and the triggering bits are defined to refer to Table 7. That is, first A-SRS setting (a first SRS parameter set) to third A-SRS setting (a third SRS parameter set) are configured in advance through higher layers, and a terminal transmits an A-SRS based on one of the A-SRS settings.

SRS power control separated from PUSCH power control may be set to be applied to particular A-SRS setting among the A-SRS settings. To achieve this, a flag bit having a size of 1 bit is defined for each A-SRS setting. An operation according to the present invention is indicated when the flag bit is 1, and an operation in which SRS power control is linked to PUSCH power control as before is indicated when the flag bit is 0. A-SRS setting applied separately from PUSCH power control may be specified using a separate message rather than defining a flag bit for each A-SRS setting. Such signaling may be defined as higher-layer signaling or as a form included in DCI.

In addition, a higher-layer signal indicating whether to activate the operation and a TPC command of DCI entailing A-SRS triggering may be applied to power control of a PUCCH or a PUSCH corresponding to the DCI in addition to the SRS power control at the same time.

For example, an operation (i) may be performed so that the TPC command is simultaneously applied to PUSCH power control and A-SRS power control by being restricted to an uplink grant or an operation (ii) may be performed so that the TPC command is simultaneously applied to PUCCH power control and A-SRS power control by being restricted to a downlink grant. In addition, both operations (i) and (ii) may be activated. That is, the higher-layer signal may represent a case in which both operations (i) and (ii) are applied in addition to a case in which operation (i) is applied and a case in which operation (ii) is applied.

Information about whether to activate the operation of the present invention may be signaled by being dynamically added to a DCI field or by reinterpreting an existing field rather than using the higher-layer signal. For example, according to an existing 3GPP standard document, an indicator having a size of 1 bit which indicates whether to allocate multi-cluster resources (or whether to allocate discontinuous cluster resources) is defined in an uplink grant. However, the allocation of multi-cluster resources (or the allocation of discontinuous cluster resources) causing an increase in peak-to-average power radio (PAPR) is a resource allocation scheme for a terminal positioned at a center of a cell and is not generally used when a terminal is positioned at a cell boundary as in the CoMP scheme. Therefore, when the CoMP scheme is employed as in the present invention, a corresponding field may be used to indicate whether a TPC command field is simultaneously applied to PUSCH power control and A-SRS power control rather than using the corresponding field for an original purpose. The scheme is merely an example. A scheme of reusing a particular field among various fields previously included in DCI for the above-described purpose is within the spirit of the present invention. It is possible to define a new field and include the new field in DCI.

Furthermore, an operation may be performed by being linked to a particular subframe index set so that a TPC command is applied to an A-SRS when a particular DCI is transmitted to the particular subframe index set and the TPC command is applied to a PUCCH or a PUSCH when DCI is transmitted to another subframe index set. Here, the operation may be implemented in the form of a subframe index set bit map or be implemented in a scheme using a subframe period, an offset, etc.

Hereinafter, description is separately provided based on whether the DCI is an uplink grant or a downlink grant. First, a case in which the DCI is an uplink grant is described.

When an uplink grant including A-SRS triggering such as DCI format 0 is received in a state in which the operation is activated using a higher-layer signal, a terminal interprets a TPC command field in the uplink grant as being only applied to power control of the A-SRS. That is, the operation is performed so that the A-SRS is separated from a TPC command of a PUSCH and a closed-loop power control parameter $h_c(i)$ is separately accumulated.

Furthermore, when a plurality of A-SRS settings are applied separately from PUSCH TPC, the A-SRS settings may be configured by higher-layer signals so that two or more A-SRS settings thereof employ a common closed-loop power control parameter. In this instance, the TPC command field in the uplink grant may be commonly applied to another A-SRS setting set to employ the common closed-loop power control parameter in addition to A-SRS setting triggered in the uplink grant.

When a TPC command for the PUSCH is to be signaled under a circumstance in which TPC of the PUSCH and TPC of an A-SRS are separated from each other, an uplink grant only for the PUSCH is transmitted using a scheme of excluding A-SRS triggering or excluding A-SRS triggering of an A-SRS triggering field in the uplink grant. In addition, a TPC command field included therein functions as a closed-loop control parameter of the PUSCH.

In a current 3GPP standard document, one or more A-SRSs among a plurality of A-SRS settings are triggered using a field having a size of 2 bits of DCI format 4 corresponding to an uplink grant. That is, a plurality of A-SRS settings are predefined, and A-SRS triggering is selectively performed among the A-SRS settings. Therefore, when an uplink grant entailing particular A-SRS triggering is received, a terminal may operate using a TPC command included in the uplink grant as a closed-loop power control parameter of power control only for A-SRS setting corresponding to a particular A-SRS. Two or more A-SRS settings may be configured by a higher-layer signal to apply a common closed-loop power control parameter. In this instance, a TPC command included in the uplink grant is commonly applied to another A-SRS setting set to apply the common closed-loop power control parameter in addition to the A-SRS setting triggered in the uplink grant.

When the terminal is to report power headroom to an eNB through a PUSCH in a state in which the operation of the present invention is activated, it is preferable that the terminal report power headroom of the PUSCH and report power headroom corresponding to an A-SRS having separated power control at the same time. In particular, a ratio of the power headroom of the PUSCH to the power headroom corresponding to the A-SRS or a difference between the power headroom of the PUSCH and the power headroom corresponding to the A-SRS may be transmitted when the power headroom of the PUSCH is reported.

Subsequently, a case in which the DCI is a downlink grant is described.

When a downlink grant including A-SRS triggering such as DCI format 1A (or DCI format 2B/2C is included in a case of the TDD system) is received in a state in which the operation is activated using a higher-layer signal, a terminal interprets a TPC command field in the downlink grant as being only applied to power control of the A-SRS. That is, the operation is performed so that the A-SRS is separated from a TPC command of a PUCCH and a closed-loop power control parameter $h_c(i)$ is separately accumulated.

Furthermore, when a plurality of A-SRS settings are applied separately from PUCCH TPC, the A-SRS settings may be configured by higher-layer signals so that two or more A-SRS settings thereof employ a common closed-loop power control parameter. In this instance, the TPC command field in the downlink grant may be commonly applied to another A-SRS setting set to employ the common closed-loop power control parameter in addition to A-SRS setting triggered in the downlink grant.

When a TPC command for the PUCCH is to be signaled under a circumstance in which TPC of the PUCCH and TPC of an A-SRS are separated from each other, a downlink grant is transmitted using a scheme of excluding A-SRS triggering or excluding A-SRS triggering of an A-SRS triggering field in the downlink grant. In addition, a TPC command field included therein functions as a response to a PDSCH scheduled by the downlink grant, that is, a closed-loop power control parameter of the PUCCH.

Meanwhile, A-SRS triggering may be restricted to a case in which a downlink grant (for example, DCI format 1A) is received in a UE-specific search space (USS). In this case, when the downlink grant is received in a common search space (CSS), A-SRS triggering may not be entailed. Thus, in this instance, a TPC command field may be interpreted as being applied to a PUCCH at all times. On the other hand, when the downlink grant is received in the USS, A-SRS triggering may be entailed. Therefore, a TPC command is applied to an A-SRS. However, when the downlink grant is received in the USS, A-SRS triggering may not be entailed. In this case, a TPC command field may be interpreted as being applied to a PUCCH. Alternatively, a TPC command may be applied to an A-SRS irrespective of the presence of A-SRS triggering when the downlink grant is detected from the USS, and may be used for PUCCH TPC as before when the downlink grant is detected from the CSS. Information about whether to activate the operations may be indicated through higher-layer signaling.

Meanwhile, a dummy grant may be signaled at the time of A-SRS triggering. The dummy grant may be implemented such that a resource allocation bit of an uplink grant or a downlink grant is set to 1 or a predetermined state capable of indicating the absence of resource allocation is indicated. In this case, since resource allocation of a PUSCH (or a PDSCH) is absent, factors related to the A-SRS triggering may be signaled using insignificant fields (for example, a modulation and coding scheme (MCS) index field or a redundancy version (RV) field) linked thereto. Here, examples of the factors related to the A-SRS triggering may include a factor for increasing a range of the TPC command. As described above, when a plurality of A-SRS settings are applied separately from PUCCH TPC, the A-SRS settings may be configured by higher-layer signals so that two or more A-SRS settings thereof employ a common closed-loop power control parameter. In this instance, it is possible to signal a TPC command for A-SRS setting configured to apply another closed-loop power control parameter using an insignificant field related to a resource allocation bit.

A more specific example is described with regard to a case of employing a scheme of increasing a range of the TPC command by reusing the MCS index field and the RV field. First, it is presumed that an existing TPC command field has a size of 2 bits and represents one of the values [−1, 0, 1, 2]. When the MCS index field and the RV field have a total size of 5 bits, the TPC command field having a size of 2 bits may be predefined as being allocated to a space of 4 bits twice out of the total size of 5 bits. Then, a total of three TPC command indices are signaled. The respective TPC command indices may be provided with (+2, +2, +2) to represent +6 dB and may be provided with (−1, −1, −1) to represent −3 dB. A range in which a TPC command is represented increases when compared to an existing range of −1 dB to 2 dB. Here, the number of TPC command fields applicable to each A-SRS setting may vary and may be preset for each A-SRS setting by a higher-layer signal.

When the MCS index field and the RV field have a total size of 5 bits, it is possible to consider a scheme of separately defining a TPC command table corresponding thereto as another scheme. For example, when the added 5-bit TPC command index may represent one of values [−15, −14, . . . , 0, . . . , 15, 16], the 5-bit TPC command index may be combined with an existing 2-bit TPC command index to signal a TPC command in a greater range.

Alternatively, the MCS index field and the RV field having a total size of 5 bits and the existing 2-bit TPC command index may be interpreted as a 7-bit TPC command field. Therefore, a TPC command for one of [−{(2⁷)/2−1}, . . . , 0, . . . , (2⁷)/2] corresponding to an index range that may be represented by 7 bits is signaled.

The above-mentioned schemes are merely examples and the application thereof may be extended as below. While portions including reusable bit space such as the MCS index field and the RV field are considered to be used for a TPC command for setting an A-SRS configured to apply another closed-loop power control parameter rather than a common TPC command, each TPC command may be allocated to each extended range.

In a heterogeneous network as shown in FIG. 8 in which a power control process for an SRS is present in the wireless communication system including the Macro-eNB and the Pico-eNB, the power control process only applies path loss compensation with respect to the Macro-eNB, and power control is performed for PUSCH link adaptation to the Pico-eNB based only on a TPC command, a range of power to be corrected by the TPC command may significantly increase. In this case, according to the present invention, the corrected power may be dynamically signaled using the increased TPC command range.

Second Embodiment

First, a second embodiment of the present invention proposes to newly define $P_{SRS\_OFFSET,c}$ (2) corresponding to a semi-static power offset parameter separately from a TPC command field as a method of controlling power for an A-SRS separately from power control of a P-SRS.

As described above, existing $P_{SRS\_OFFSET,c}(0)$ is a parameter for a P-SRS and $P_{SRS\_OFFSET,c}(1)$ is a parameter for an A-SRS linked to an existing PUSCH. In addition, ranges of $P_{SRS\_OFFSET,c}(0)$ and $P_{SRS\_OFFSET,c}(1)$ and are determined based on $K_S$ corresponding to a PUSCH transmission power parameter described above. Specifically, $P_{SRS\_OFFSET,c}(m)$ is a bit field having a size of 4 bits, and represents values in a range of 0 to 15. The values indicate that $P_{SRS\_OFFSET,c}(m)$ is mapped in units of 1 dB in a range of [−3, 12] dB when $K_S$ is 1.25 and is mapped in units of 1.5 dB in a range of [−10.5, 12] dB when $K_S$ is 0.

The second embodiment of the present invention proposes to additionally define $P_{SRS\_OFFSET,c}(2)$ for an A-SRS for acquiring downlink CSI when the CoMP scheme is employed and to define a range thereof irrespective of $K_S$ corresponding to the PUSCH transmission power parameter. For example, signaling is performed in units of c dB in a range of [a, b] dB. Here, values of a, b, and c may be defined as fixed values, and may semi-statically vary by higher-layer signaling.

For example, the step value c may be a value selected from 1 dB, 1.25 dB, 1.5 dB and 2 dB. In addition, the maximum value b dB is preferably determined based on the fact that a Macro-eNB is a downlink transmission point and a Pico-eNB is an uplink reception point. Specifically, when the fact that maximum transmission power of the Macro-eNB is 46 dB and maximum transmission power of the Pico-eNB is 30 dB is considered, the value b may be set to 28 dB by adding 16 dB corresponding to a difference in transmission power between the Macro-eNB and the Pico-eNB to an existing maximum value of 12 dB.

However, the minimum value "a" may be set to −3 dB as before. A UE that needs to additionally set the A-SRS for acquisition of the downlink CSI corresponds to a cased in which the Macro-eNB is the downlink transmission point and the Pico-eNB is the uplink reception point. Therefore, a UE transmitting and receiving a signal according to the CoMP scheme as in the present invention is rarely present in a coverage central area of a particular Pico-eNB. Since a UE is rarely present in a coverage central area of a particular Pico-eNB as in a case in which a UE is positioned in a coverage central region of a particular Pico-eNB and $P_{SRS\_OFFSET,c}(m)$ is set to −10.5 dB when $K_S$ is 0, it is preferable to set a minimum value of $P_{SRS\_OFFSET,c}(2)$ to a minimum value corresponding to a case of $K_S$=1.25.

In summary, according to the second embodiment of the present invention, it is preferable that $P_{SRS\_OFFSET,c}(2)$ of the A-SRS set for acquiring downlink CSI not have a lower limit which is lower than a particular value in an existing offset range and have an upper limit set to a greater value than an existing value.

For example, when $P_{SRS\_OFFSET,c}(m)$ having a size of 4 bits is extendable to a size of 5 bits, $P_{SRS\_OFFSET,c}(2)$ may be set to {−3, −2, . . . , 28} where a=−3, b=28, and c=1.

When $P_{SRS\_OFFSET,c}(m)$ is represented by a size of 4 bits as before, $P_{SRS\_OFFSET,c}(2)$ may be set to {6, 7.5, . . . , 28.5} where a=6, b=28.5, and c=1.5 or be set to {5.5, 7, . . . , 28} where a=5.5, b=28, and c=1.5. Alternatively, $P_{SRS\_OFFSET,c}(2)$ may be set to {−2, 0, . . . , 28} where a=−2, b=28, and c=2 and be set to various other ranges.

In addition, a range of existing $P_{SRS\_OFFSET,c}(m)$ may be extended rather than newly defining a range only for $P_{SRS\_OFFSET,c}(2)$ as described above. However, when the extended $P_{SRS\_OFFSET,c}(m)$ is applied to a case not employing the CoMP scheme, all existing requirements of a UE may be corrected or performance may be degraded due to a factor imposing a heavy burden on implementation of the UE. Therefore, $P_{SRS\_OFFSET,c}(m)$ applying an extended range may be applied to a case of operating in a CoMP mode (a case of operating in transmission mode 10 according to the 3GPP standard document) or a case in which a particular virtual cell identifier (VCID) is provided as a factor used when various RS (a PUSCH DMRS, a PUCCH DMRS, an SRS, a CSI-RS and a downlink DMRS) sequences are generated. Further, since acquisition of downlink CSI using an A-SRS is applied in the TDD system, $P_{SRS\_OFFSET,c}(m)$ applying an extended range may be restricted to be applied in the TDD system.

For example, when the extended range of $P_{SRS\_OFFSET,c}(m)$ is signaled by a field having a size of 5 bits, Table 8 below may be generated. However, ranges and step values of Table 8 below are merely examples, and may be variously changed.

TABLE 8

|        | $K_S$ | Range (dB)    | Step size (dB) |
|--------|-------|---------------|----------------|
| Alt. 1 | 0     | [−10.5, 28.5] | 1.25           |
|        | 1.25  | [−3, 28]      | 1              |
| Alt. 2 | 0     | [−18, 28.5]   | 1.5            |
|        | 1.25  | [−3, 28]      | 1              |
| Alt. 3 | 0     | [−10.5, 36]   | 1.5            |
|        | 1.25  | [−3, 35.75]   | 1              |
| Alt. 4 | 0     | [−10.5, 36]   | 1.5            |
|        | 1.25  | [−3, 28]      | 1              |

Alternatively, the extended $P_{SRS\_OFFSET,c}(m)$ may be applied as a default and an operation may be performed in a relatively narrow range, for example, an existing range of $P_{SRS\_OFFSET,c}(m)$ when the operation is not performed in the CoMP mode or a particular VCID is not provided as a factor used when various RS sequences are generated. That is, a UE may expect that $P_{SRS\_OFFSET,c}(m)$ is actually signaled in a particular range [−X, Y] under a particular condition even when $P_{SRS\_OFFSET,c}(m)$ is set to an extended range and may not interpret a problem occurring when $P_{SRS\_OFFSET,c}(m)$ out of the range [−X, Y] is signaled as a problem in terms of implementation of the UE.

Third Embodiment

In a third embodiment of the present invention, a condition to which the first embodiment and the second embodiment are applied is described.

The first embodiment and the second embodiment may be separately applied for each A-SRS setting. That is, a virtual identifier such as one or more particular VCIs in addition to a default identifier such as a physical cell ID (PCI) may be preset independently (or commonly between some of the settings) for each of the A-SRS settings (for example, A-SRS settings for respective DCI formats or A-SRS settings according to a plurality of states as shown in Table 7 in DCI format 4).

In this circumstance, when a VCI for a PUSCH (or for a PUCCH) is transmitted from a higher layer, an operation of applying the VCI at the time of generating an A-SRS sequence may be activated for all A-SRSs. Alternatively, an operation of applying the VCI for each A-SRS setting may be separately activated. In addition, the application of the VCI may be interpreted as signaling for activating an operation in which a TPC command field of a DCI format in which A-SRS transmission according to A-SRS setting is triggered as in the first embodiment is independently applied to the A-SRS and is accumulated, that is, information for $h_c(i)$. In addition, the application of the VCI may be interpreted as signaling for activating the application of $P_{SRS\_OFFSET,c}(2)$ as in the second embodiment.

That is, information about whether transmission power is processed by being linked to a PUSCH as before for each A-SRS setting or by a separate transmission power process irrespective of PUSCH transmission power may be signaled by a higher-layer signal (for example, transmission of the VCI, etc.).

It is possible to determine whether to link an A-SRS transmission power process to a PUSCH based on a characteristic of a search space where DCI format is detected. That is, when DCI is received in a CSS, a TPC command field in the DCI is used as a closed-loop power control factor $f_c(i)$ of a PUSCH or a PUCCH and an offset value of $P_{SRS\_OFFSET,c}(1)$ is applied as before. On the other hand, when the DCI is received in a USS, a TPC command field in the DCI is used as an independent power control factor $h_c(i)$ of an A-SRS and an offset value of $P_{SRS\_OFFSET,c}(2)$ is applied. It is possible to determined whether to activate this operation by a higher layer.

Further, as a scheme of signaling $h_c(i)$ corresponding to the independent closed-loop power control factor of an A-SRS, that is, a TPC command, it is possible to receive a particular tpc-Index and a particular TPC-PUSCH-RNTI signaled to a higher layer in advance to detect separate DCI for the TPC command such as DCI formats 3 and 3A. In this case, each of DCI formats 3 and 3A detected by the particular tpc-Index and the particular TPC-PUSCH-RNTI is used as the independent closed-loop power control factor of an A-SRS.

When five independent closed-loop power control factors (for example, $h_1(i), h_2(i), \ldots$) are present, it is preferable to link the particular tpc-Index and the particular TPC-PUSCH-RNTI to each of the closed-loop power control factors. For example, a particular tpc-Index(n) and a particular TPC-PUSCH-RNTI(n) separately linked to each parameter $h_n(i)$ in a form of $\{h_n(i), \text{tpc-Index}(n), \text{TPC-PUSCH-RNTI}(n)\}$, etc. may be transmitted, which may be used to apply DCI format for a separate TPC command to a particular $h_n(i)$.

Each of the first to third embodiments of the present invention describes a method for controlling power for an A-SRS separately from PUSCH power control under a circumstance in which power control of a P-SRS is linked to power control of a particular PUSCH. However, the present invention may be applied to a case in which separate PUSCH transmission power control is performed due to different uplink/downlink subframe settings applied to respective component subcarriers in the TDD system employing carrier aggregation.

Figure 9:
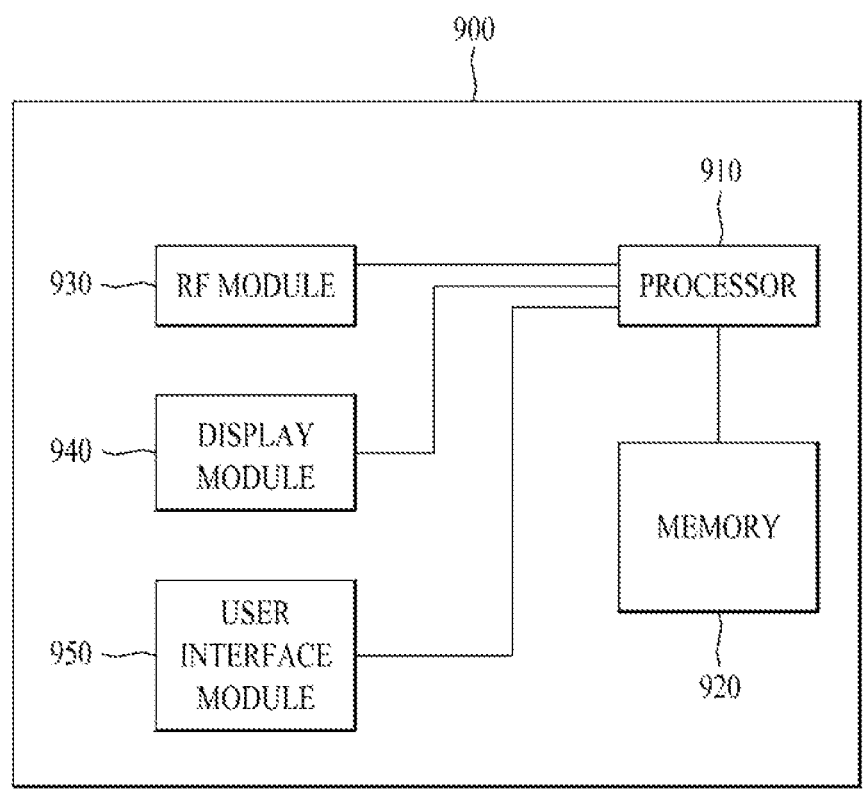
FIG. 9 is a block diagram of a communication device according to an embodiment of the present invention.

FIG. 9 is a block diagram of a communication device according to an embodiment of the present invention.

Referring to FIG. 9, the communication device, denoted by reference numeral 900, includes a processor 910, a memory 920, a radio frequency (RF) module 930, a display module 940, and a user interface module 950.

The communication device 900 is illustrated for convenience of description and some of modules thereof may be omitted. In addition, the communication device 900 may further include necessary modules. Moreover, some modules of the communication device 900 may be divided into segmented modules. The processor 910 is configured to perform the operations according to embodiments of the present invention illustrated with reference to the drawings. Specifically, descriptions of FIGS. 1 to 8 may be referred to for a detailed operation of the processor 910.

The memory 920 is connected with the processor 910 and stores an operating system, an application, program code, data, etc. therein. The RF module 930 is connected to the processor 910 and converts a baseband signal into a radio signal or vice versa. To achieve this, the RF module 930 performs analog conversion, amplification, filtering and frequency uplink conversion, or performs reverse processes thereof. The display module 940 is connected to the processor 910 and displays various types of information. Examples of the display module 940 include, but are not limited to, a liquid crystal display (LCD), a light emitting diode (LED), and an organic light emitting diode (OLED). The user interface module 950 is connected to the processor 910 and may be configured by a combination of well known user interfaces such as a keypad and a touch screen.

The aforementioned embodiments are achieved by a combination of structural elements and features of the present invention in a predetermined manner. Each of the structural elements or features should be considered selectively unless otherwise specified. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. It will be apparent that some claims not explicitly referring to one another may be combined to constitute an embodiment or to be included as a new claim by means of amendment after the application is filed.

The embodiments according to the present invention may be implemented by various means, for example, hardware, firmware, software, or a combination thereof. If an embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If an embodiment according to the present invention is implemented by firmware or software, the embodiment of the present invention may be implemented by a type of a module, a procedure, or a function, which performs functions or operations as described above. Software code may be stored in a memory unit and then driven by a processor. The memory unit may be located inside or outside the processor to transmit and receive data to and from the processor through various well-known means.

It will be apparent to those skilled in the art that the present invention may be embodied in other specific forms without departing from characteristics of the invention. Thus, the descriptions are to be considered in all respects as illustrative and not restrictive. The scope of the invention should be determined by reasonable interpretation of the appended claims and all change which comes within the equivalent scope of the invention are within the scope of the invention.

INDUSTRIAL APPLICABILITY

The method for controlling transmission power of a sounding reference signal (SRS) in the above-mentioned wireless communication system and an apparatus therefor have been described based on an example in which the method and apparatus are applied to a 3rd generation partnership project long term evolution (3GPP LTE) system. However, the method and the apparatus are applicable to various wireless communication systems in addition to the 3GPP LTE system.

The invention claimed is:

1. A method for transmitting a sounding reference signal (SRS) by a terminal, the terminal receiving a downlink signal from a first base station and transmitting an uplink signal to a second base station in a wireless communication system, the method comprising:
   receiving, from the first base station, downlink control information including a transmit power control field;
   determining transmission power of the first SRS based on the transmit power control field; and
   transmitting the first SRS to the first base station with the determined transmission power,
   wherein, when the downlink control information is received in a UE-specific search space, the transmission power is determined by applying the power control field to a first closed-loop parameter used only for determining the transmission power of the first SRS regardless of a transmission power of an uplink data channel or an uplink control channel, and
   wherein, when the downlink control information is received in a common search space, the transmission power is determined by applying the power control field to a second closed-loop parameter used for determining the transmission power of the uplink data channel or the uplink control channel.

2. The method according to claim 1, wherein the first SRS is an SRS for acquisition of downlink channel state information.

3. The method according to claim 1, further comprising receiving offset information of the transmission power of the first SRS based on transmission power of an uplink data channel from a higher layer,
   wherein the offset information reflects a difference in maximum transmission power between the first base station and the second base station.

4. The method according to claim 3, further comprising periodically transmitting a second SRS to the second base station.

5. The method according to claim 4, further comprising receiving offset information of transmission power of the second SRS based on the transmission power of the uplink data channel from the higher layer,
   wherein the transmission power of the second SRS has a maximum offset less than a maximum offset of the first transmission power.

6. The method according to claim 1, wherein a resource allocation field in the downlink control information indicates absence of resource allocation, and at least one field associated with the resource allocation field is added to the transmission power control command field.

7. The method according to claim 1, wherein the wireless communication system is a time division duplex (TDD) system.

8. The method according to claim 1, further comprising:
   transmitting data to the first base station on the uplink data channel or the uplink control channel with the transmission power determined for the uplink data channel or the uplink control channel.

9. A terminal device in a wireless communication system comprising:
   a receiver configured to receive from the first base station:
      downlink control information including a transmit power control field for a first SRS;
   a processor configured to determine transmission power of the first SRS based on the downlink control information; and
   a transmitter configured to transmit the first SRS to the first base station with the determined transmission power,
   wherein, when the downlink control information is received in a UE-specific search space, the transmission power is determined by applying the power control field to a first closed-loop parameter used only for determining the transmission power of the first SRS regardless of a transmission power of an uplink data channel or an uplink control channel, and
   wherein, when the downlink control information is received in a common search space, the transmission power is determined by applying the power control field to a second closed-loop parameter used for determining the transmission power of the uplink data channel or the uplink control channel.

10. The terminal device according to claim 9, wherein the terminal device is positioned in an area in which a downlink signal is received from the first base station and an uplink signal is transmitted to a second base station.

11. The terminal device according to claim 10, wherein the transmitter periodically transmits a second SRS to the second base station.

12. The terminal device according to claim 9,
   wherein the transmitter is further configured to transmit data to the first base station on the uplink data channel or the uplink control channel with the transmission power determined for the uplink data channel or the uplink control channel.

* * * * *